July 5, 1938.                M. J. E. GOLAY                2,122,464
                           ELECTRICAL APPARATUS
                            Filed Jan. 8, 1932
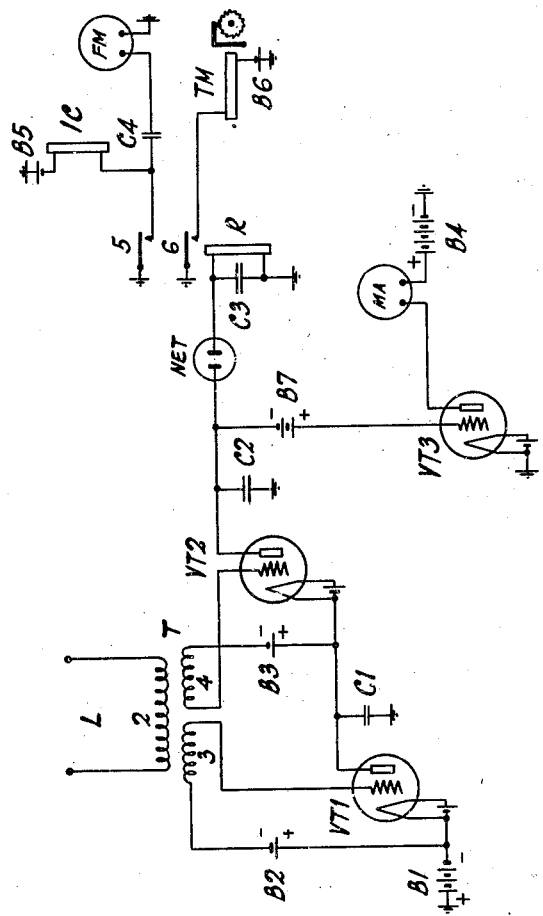
Inventor
Marcel J.E. Golay
Clinton R. Sipes
Atty.

Patented July 5, 1938

2,122,464

UNITED STATES PATENT OFFICE 2,122,464

ELECTRICAL APPARATUS

Marcel J. E. Golay, Long Branch, N. J., assignor, by mesne assignments, to Associated Electric Laboratories, Inc., Chicago, Ill., a corporation of Delaware Application January 8, 1932, Serial No. 585,524

8 Claims. (Cl. 175—320)

The present invention relates to electrical apparatus but as disclosed herein is concerned more particularly with registering systems used to register the number of received impulses; and the object of the invention, generally stated, is the production of a novel registering system for registering received impulses which may be either irregular as to spacing and duration or so high in frequency that the ordinary registering devices will not respond directly thereto. Certain features of the invention will be found of utility for other purposes.

GENERAL DESCRIPTION

As an example of one use for the improved registering device, it may be pointed out that the registering of electrical disturbances usually accompanying electrical storms and other similar natural phenomena presents a rather difficult problem because of the unsystematic irregularity of the disturbances. Such disturbances manifest themselves audibly in the head phones or loud speakers of radio receivers as irregular noises, commonly referred to as static. As is well known, the disturbing impulses are of such an irregular nature that ordinary mechanical registering or totalizing devices cannot be made to satisfactorily register the impulses and give a reading of the total number received in a given period of time. Since a proper record of the total number of received disturbances is important to power companies, radio stations, and others, it is readily apparent that a suitable responding and totalizing device will be of considerable utility. The system disclosed herein obviates the use of a mechanical device for responding to each and every impulse of a disturbance by utilizing electrical storing means for storing a predetermined number of impulses and for operating a mechanical registering device to register sub-multiples of the total number of received impulses.

An additional use for the improved registering or indicating system is for use in indicating directly the frequency of high frequency currents such as those used as carrier frequencies in signalling systems. When used for this purpose, the registering system or device serves merely to respond to the impulses of the high frequency current and to transmit a sub-multiple of the received frequency to a conventional type of frequency meter, which (by a suitably revised calibration) directly indicates the input frequency.

As disclosed herein, the registering system employs a pair of serially related vacuum tubes normally biased so that plate current is prevented from flowing, together with a system of condensers associated with the vacuum tubes for accumulating charges as the vacuum tubes are rendered conductive alternately responsive to received impulses; in combination with suitable means for discharging the final storing condenser of the system each time the charge thereon reaches a predetermined value, and for registering the number of discharges of such condenser.

Other objects and features of the invention may be understood best upon a further perusal of the specification in connection with the accompanying drawing, forming a part thereof.

Description of the drawing

Referring now to the single sheet of drawings an input line or signal line L terminates at the primary winding 2 of the transformer T, being the line over which the impulses to be registered are received; the impulses being impressed on the line L in any suitable or desired manner. The impulses are relayed through the vacuum tubes VT1 and VT2 in a manner to be explained hereinafter, causing successive, measured impulses of charging current to be delivered to the condenser C2 from the battery B1. The neon tube NET is arranged to "flash" and partially discharge the condenser C2 each time the potential of the stored charge reaches the flashing point of the neon tube. The relay R is included in the flashing circuit of the neon tube, so that it is operated momentarily each time the condenser C2 is partially discharged through the neon tube NET. The condenser C3 is shunted around the relay R so as to give a quick discharge circuit for the neon tube and cause a quick cessation of the flash.

The totalizing meter TM is connected in circuit between contact 6 of the relay R and the battery B6, so that it is operated each time the relay R is operated to close the contact 6. This meter may be provided with the usual interlocked number wheels so that the total number of operations of the meter TM may be read by observing the positions of the several number wheels of the meter. This meter may be similar to the message registers or individual subscriber meters used in telephone systems to register the total number of completed calls originated by a subscriber.

The frequency meter FM is controlled through contacts 5 of the relay R by an alternating current source attached through the condenser C4 as the circuit through the impedance coil IC from the battery B5 is alternately opened and closed. The frequency meter may be calibrated to read the frequency of impulses impressed on the line L, when the system is employed for obtaining a frequency reading in addition to, or in place of, being used as a totalizing device.

The vacuum tube VT3 has its grid element connected to the free terminal of the condenser C2 by way of the grid battery B7, whereby the grid potential at the vacuum tube VT3 varies according to the potential of the charge on the condenser C2. The battery B4 is of suitable voltage to cause a current-flow through the milliammeter MA which varies inversely as the potential impressed on the storage condenser C2.

The vacuum tubes VT1 and VT2 have their filament-plate circuits connected in series with each other and between the charging battery B1 and the condenser C2, which receives the charging current and controls the relay R through the neon tube NET. The grid elements of the tubes VT1 and VT2 are negatively biased to the cut-off point by the batteries B2 and B3, respectively. From this it will be understood that the grids of the tubes VT1 and VT2 are maintained sufficiently negative to prevent current-flow normally from the battery B1 to the condenser C2. The condenser C1 is connected so as to receive current by way of the vacuum tube VT1 when this tube is rendered conductive, which current is subsequently passed on to the condenser C2 by way of the vacuum tube VT2 when the second controlling vacuum tube is rendered conductive; the transformer windings are oppositely connected so that the two tubes are rendered conductive alternately. By adjusting the capacity of the condenser C1 with respect to the condenser C2, the number of impulses required to charge the condenser C2 to a predetermined potential is predetermined. It will be understood, of course, that the capacity of the condenser C2 may be very large relative to the capacity of the condenser C1.

DETAILED DESCRIPTION

The invention having been described generally, a detailed description of the operation of the system will now be given. For this purpose it will be assumed that the system is connected to receive impulses of "static" or similar electrical disturbances and to register the total number of such disturbing impulses on the totalizing meter TM.

Recording total number of impulses

Upon the passage of each impulse through the primary winding 2 of the transformer T, an impulse of one polarity is generated in the transformer winding 3, and an impulse of the opposite polarity is generated in the transformer winding 4. It will be apparent, of course, that for each impulse received in the primary winding there is an impulse produced in each secondary winding of one direction as the current rises in the primary winding and in the opposite direction in the secondary windings as the current falls in the primary winding.

When the impulse generated in the secondary winding 3 is in such a direction as to render the grid element of the vacuum tube VT1 more negative, there is no action at the tube VT1. But, when the impulse generated in the secondary winding 3 is in such a direction as to render the grid element of the vacuum tube VT1 less negative, an impulse of current flows from the battery B1 through the filament-plate circuit of the vacuum tube VT1 to place a charge on the condenser C1. It will be understood, of course, that this charging of the condenser C1 through the vacuum tube VT1 occurs at a time when the grid element of the vacuum tube VT2 is being rendered more negative by the action of the oppositely connected secondary winding 4.

When the polarity of the electrical impulse generated in the secondary windings of the transformer T is reversed, the tube VT1 is again rendered non-conductive, while the tube VT2 is rendered conductive. At this time, the condenser C1 discharges into the condenser C2, placing a predetermined unit of charge on the condenser C2. This unit of charge placed on the condenser C2 is, within wide limits, practically independent of the voltage or duration of the impulse received over the line L at the transformer T as will now be particularly pointed out:

By employing a tube at VT1 having a low D. C. plate resistance, the condenser C1 may be charged almost instantaneously to the full potential of the battery B1, as long as the capacity of the condenser C1 is maintained relatively low. Then, when the tube VT1 has been rendered non-conductive and the tube VT2 is rendered conductive the condenser C1 may be almost instantaneously discharged into the condenser C2 through the tube VT2, if the tube VT2 also is one having a low D. C. plate resistance.

Operating the totalizing meter

As the charge accumulates on the condenser C2 responsive to the successive impulses received from the interposed charging condenser C1, the potential rises until the breakdown or flashing point in the neon tube is reached, whereupon the neon tube becomes conductive and carries current to the relay R and the by-pass condenser C3 until the potential across the neon tube drops off to such a point that the current-flow cannot be maintained. By making the condenser C3 large with respect to the condenser C2, the condenser C2 may discharge almost immediately through the neon tube, thereby quickly placing the condenser C2 in condition to receive additional charging impulses, while the condenser C3 discharges more slowly through the relay R, bringing about the operation of the relay.

When the relay R responds to a discharge current from the condenser C2, it closes its contact 6 to operate the totalizing meter TM, whereat the number wheels are suitably advanced to display the next higher number.

Using the system as a static voltmeter

When the electrical disturbances are being received at infrequent intervals, so that the totalizing meter TM is only infrequently operated, it becomes desirable to have a means of ascertaining the state of charge of the condenser C2 at intervals so as to obtain a closer indication of the number of electrical disturbances being received in a given unit of time. A static voltmeter of conventional design may be employed connected across the terminals of the condenser C2, but it is believed that such a voltmeter may possibly be damaged by frequent and violent voltage fluctuations. Moreover, static voltmeters are rather expensive and somewhat difficult of calibration. For this reason, the vacuum tube VT3 is employed to control the flow of current through the milliammeter MA as the potential of the condenser C2 rises and falls. Under the assumption that the point at which the neon tube NET breaks the current is such that the residual charge on the condenser C2 is normally high enough to maintain the grid of the vacuum tube VT3 at the cut-off point or above, the grid battery B1 is employed to reduce the negative potential at the vacuum tube VT3 to the proper amount so that the cut-off point is not reached at the vacuum tube VT3 with a full charge on the condenser C2. The current-flow through the milliammeter MA then gives an inverse indication of the state of charge of the condenser C2; the higher the charge the lower the current. It is preferable that the milliammeter be inversely calibrated so as to read the potential of the condenser C2 directly.

*Using the system as a frequency meter*

As is well known, many of the frequencies used in signalling systems lie beyond the range of standard frequency meters (either of the moving coil type or the tuned reed type). No entirely satisfactory method has been devised heretofore, so far as applicant is aware, for obtaining readings of these higher frequencies. One of the methods in use involves setting a wave meter or other calibrated tuning device to the point of resonance with the incoming current and in then reading the frequency according to the setting required for resonance. With the use of the system herein disclosed, an ordinary frequency meter may be attached and calibrated to read the higher frequencies, giving a direct reading of any desired frequency within a given range.

When it is desired to operate the system to control the frequency meter, it is necessary merely to connect the terminals of the line L to the source of current whose frequency is to be measured, whereupon impulses of the current passing through the coil 2 cause alternating current to flow through the coils 3 and 4 as hereinbefore described, causing measured charges to be delivered to the condenser C2 at intervals depending upon the frequency of the current impressed on line L. The condenser C2 then discharges at regular intervals through the neon tube NET, operating the relay R at a desired sub-multiple of the frequency impressed on the line L. Each time the relay R operates, it causes current to flow from the battery B5 through the impedance coil IC, the circuit of the impedance coil IC being opened each time relay R falls back. By the shunt connection through the condenser C4 and the frequency meter FM, alternating current is obtained in the frequency meter FM having a frequency corresponding to the frequency of operation of the relay R. This alternating current operates the meter FM to show the frequency at which the relay R is operating; or, if preferred, the frequency impressed on the line L, as the frequency meter FM may be recalibrated to indicate the input frequency of the system rather than the frequency received by the meter, in which case the person reading the meter does not have to use a multiplier to obtain the frequency of the current on the line under test.

It will be understood, of course, that the totalizing meter TM and the vacuum tube VT3 may be disconnected or not, as desired while the system is operating as a frequency meter. On the other hand, if the frequency of operation of the relay R is sufficiently low the totalizing meter TM may be employed in connection with a stop watch to afford a means of checking the accuracy of the reading of the frequency meter FM.

What is claimed is:
1. In combination, a current source and a storage condenser connected in series in a condenser-charging circuit, a pair of vacuum tubes connected in series with one another in said circuit, a charging condenser connected to said circuit at a point between the two vacuum tubes, and means for making said vacuum tubes conductive alternately whereby said charging condenser is alternately charged through one of said vacuum tubes and discharged through the other in order to effect measured changes in the state of charge of said storage condenser.

2. In combination, a condenser, a source of current for charging said condenser, a circuit for discharging said condenser when the voltage thereof reaches a certain value, said circuit including a space discharge device, a second condenser included in the discharge circuit to store the current during discharge, and an electromagnetic device connected in parallel with said second condenser so as to be operated by the discharge thereof.

3. In combination, a condenser, a vacuum tube, a circuit including the filament-plate circuit of said tube for charging said condenser, a second condenser, a second vacuum tube, a circuit including the filament-plate circuit of said second tube for discharging the first condenser into the second, and means for rendering said filament-plate circuits conductive alternately.

4. In combination, a condenser, a three element vacuum tube, a charging circuit for said condenser including the filament-plate circuit of said tube, means including a grid circuit for said tube for rendering said filament-plate circuit conductive, and a discharge circuit for said tube including a normally open space discharge device which is rendered conductive responsive to a predetermined charge accumulation in said condenser.

5. Apparatus for investigating properties of electrical impulses comprising a condenser, means responsive to each impulse for charging said condenser, a second condenser of greater capacity than said first condenser, means also responsive to each impulse for discharging said first condenser into said second condenser, means for discharging said second condenser responsive to a predetermined charge accumulation thereon, a measuring device, and means in the discharge circuit of said second condenser for controlling said device.

6. Apparatus for measuring the frequency of alternating or pulsating currents, said apparatus comprising a condenser, means controlled by the current whose frequency is being measured for repeatedly charging said condenser at a rate corresponding to the frequency of said current, a second condenser of larger capacity than said first condenser, means also controlled by said current each time the first condenser is charged for discharging it into said second condenser, means for discharging the second condenser responsive to a predetermined charge accumulation thereon, and a frequency meter controlled over the discharge circuit of the second condenser.

7. Apparatus for measuring the frequency of alternating or pulsating currents, said apparatus comprising a condenser, means controlled by the current whose frequency is being measured for repeatedly charging said condenser at a rate corresponding to the frequency of said current, a second condenser of larger capacity than said first condenser, means also controlled by said current each time the first condenser is charged for discharging it into said second condenser, means for discharging the second condenser responsive to a predetermined charge accumulation thereon, a frequency meter having a multiplying factor determined by the relative capacities of the second and first condensers, and means included in the discharge circuit of the second condenser for controlling said meter.

8. In combination, a source of current, a charge transferring condenser, and a grid controlled discharge tube connected in series, a second grid controlled discharge tube included in a circuit shunting said charge transferring condenser, a charge collecting condenser in circuit with said charge transferring condenser and charged in accordance with the charge of said charge transferring condenser, and means for modifying the grid potentials of said discharge tubes alternately for the purpose of causing said tubes alternately to become conducting thereby alternately charging and discharging one of said condensers and progressively charging the other of said condensers to successively higher potentials.

MARCEL J. E. GOLAY.